United States Patent [19]

Whyzmuzis et al.

[11] Patent Number: 4,683,262
[45] Date of Patent: Jul. 28, 1987

[54] NON-DIMER ACIDIC POLYAMIDE FROM MEDIUM CHAIN DIACID HAVING IMPROVED WATER SOLUBILITY USEFUL AS FLEXOGRAPHIC/GRAVURE INK BINDER

[75] Inventors: Paul D. Whyzmuzis, Plymouth; John M. Menke, New Brighton, both of Minn.

[73] Assignee: Henkel Corp., Minneapolis, Minn.

[21] Appl. No.: 853,090

[22] Filed: Apr. 17, 1986

Related U.S. Application Data

[63] Continuation-in-part of Ser. No. 701,903, Feb. 15, 1985, abandoned.

[51] Int. Cl.$^4$ .................. C08G 69/20; C08D 11/02
[52] U.S. Cl. .................... 524/608; 524/186; 524/244; 524/606; 524/607; 528/339; 528/993.3; 528/335; 528/336; 528/345; 528/346
[58] Field of Search ............ 528/339, 335, 336, 345, 528/346, 339.3; 524/608, 244, 186, 606, 607

[56] References Cited

U.S. PATENT DOCUMENTS

| | | | |
|---|---|---|---|
| 3,776,865 | 12/1973 | Glaser et. al. | 260/18 N |
| 3,781,234 | 12/1973 | Drawert et al. | 528/339 |
| 4,051,087 | 9/1977 | Scoggins et al. | 528/339 |
| 4,055,525 | 10/1977 | Cheng | 528/339 |

Primary Examiner—Harold D. Anderson
Attorney, Agent, or Firm—Ernest G. Szoke; Patrick J. Span

[57] ABSTRACT

Polyamide resins useful as binders in flexographic/gravure inks are provided which are essentially free of polyeric fat acids. These polyamide resins exhibit improved water solubility, yet still retain the other many desirable properties of polyamide resins based on polymeric fat acids. The resins are acid terminated having acid values greater than 30 and are prepared from medium chain (12-26 carbons) dicarboxylic acids such as the $C_{21}$ acid, 2-n-hexyl-5-(7-carboxyl-n-heptyl)-cyclohex-3-ene carboxylic acid, and aliphatic diamines having from 2-12 carbon atoms.

20 Claims, No Drawings

NON-DIMER ACIDIC POLYAMIDE FROM MEDIUM CHAIN DIACID HAVING IMPROVED WATER SOLUBILITY USEFUL AS FLEXOGRAPHIC/GRAVURE INK BINDER

FIELD OF THE INVENTION

This application is a continuation-in-part application of our co-pending application Ser. No. 701,903 filed Feb. 15, 1985, now abandoned.

This invention relates to polyamide resins having improved water solubility which are useful as flexographic/gravure ink binders. More particularly, this invention relates to polyamide resins which are essentially free of dimeric and higher polymeric fat acids.

BACKGROUND OF THE INVENTION

U.S. Pat. No. 3,776,865 to Glaser and Lovald discloses polyamide resins obtained by reacting an acid component comprised of a polymeric fat acid and another dicarboxylic acid with an amine component comprising isophorone diamine or mixtures thereof with an alkylene diamine. At least 12.5 carboxyl equivalent percent of the polymeric fat acid is employed. The patentees disclose that these resins are useful as binders applied by aqueous systems, particularly in flexographic/gravure inks where water reducibility is desired.

U.S. Pat. No. 4,051,087 to Scoggins et al describes copolyamide resins useful as hot melt adhesives, molding resins, coatings or films. These are achieved through the use of substantially requivalent amounts of carboxyl and amine, i.e. a 1:1 ratio, proving essentially neutral resins. Only a slight excess, up to 5 mol percent of carboxyl or amine may be present. Examples I, II, III and V employed a polymeric (dimeric) fat acid, while Example IV employed azelaic acid in the absence of the dimer acid. The Example IV product is indicated as inferior to the polyamide employing the dimeric fat acid.

U.S. Pat. No. 3,781,234 to Drawert et al is another patent describing polymeric fat acids polyamides useful as hot melt adhesives. Approximately stoichiometric amounts of amine (ethylene diamine) and a carboxyl are employed, providing essentially neutral polyamides, neither acid value or amine value substantially exceeding the other. A copolymerizing $C_{19}$ acid, heptadecane dicarboxylic acid is required along with the dimerized fatty acid.

U.S. Pat. No. 4,055,525 to Cheng describes a polyamide again useful as a hot melt adhesive. Substantially equivalent amounts of amine (hexamethylene diamine) and carboxyl are employed, so that a neutral polymer is provided. The acid component is comprised of a $C_{19}$ diacid in admixture with another aliphatic dicarboxylic acid containing 5–10 carbon atoms.

Polyamide resins prepared from dimeric and/or higher polymeric fatty acids for use in flexographic/gravure inks are dissolved in volatile organic solvents, such as the lower alkanols. Environmental concern over the amounts of volatile organic solvents in the atmosphere has led to a desire to use aqueous solutions that have less volatile organic solvents contained therein. In order to accommodate the reduced levels of volatile organic solvents, the polyamide resins used as binders in flexographic/gravure inks should have increased water solubility and yet retain the other desirable properties of polyamide resins, based on polymeric fat acids.

SUMMARY OF THE INVENTION

The present invention provides polyamide resins which are acid terminated, i.e. an equivalent excess of acid is used in relation to the diamine so as to provide an acid value greater than 30. The resins ideally contain no polymeric fat acid (dimeric fat acid), although a small amount, up to 5 carboxyl equivalent percent may be tolerated without unduly sacrificing the advantageous properties of the products of the present invention, particularly as a binder for inks having increased water solubility. The polyamide resins are prepared from a mixture of a medium chain (12–26 carbon) dicarboxylic acid and a short chain (2–10) carbon dicarboxylic acid. A short chain (2–6 carbon) monocarboxylic acid may be employed primarily as a chain stopper; however, its presence is not necessary and may be omitted. The acids are reacted with a diamine having from 2–12 carbon atoms.

In its broadest scope, the present invention relates to polyamide resin compositions obtained by the reaction of an acid component comprised of a medium chain dicarboxylic acid having from 12–26 carbon atoms and an amine component comprised of an aliphatic diamine containing from 2–12 carbon atoms wherein the amine equivalent of the diamine employed is less than the carboxyl equivalents of the acid component so as to provide an acid value of the resin greater than 30 and the acid value exceeds the amine value by at least 20 units.

When the acid component contains a copolymerizing short chain dicarboxylic acid, the products of the present invention may be described as polyamide resin compositions formed from, or obtained by, the amidification or condensation reaction of (A) An acid component comprising
 (1) about X equivalent percent of a medium-chain dicarboxylic acid having from 12 to 26 aliphatic carbon atoms;
 (2) about Y equivalent percent of a short-chain acyclic aliphatic dicarboxylic acid having from 2 to 10 aliphatic carbon atoms; and
(B) an amine component comprising about Z equivalent percent of a diamine having from 2 to 12 aliphatic carbon atoms or mixtures thereof; wherein the ratio of Z to the sum of X and Y is less than 1, so as to provide an acid value greater than 30.

The preferred polyamides are those wherein the ratio of Z to the sum of X and Y is less than about 0.9, more preferably ranges from about 0.50 to about 0.85, and most preferably from about 0.65 to about 0.85.

Where a monocarboxylic acid is employed in the acid component, the acid component can be defined as being a mixture of:

(a) about X equivalent percent of a medium chain dicarboxylic acid having from 12–26 aliphatic carbon atoms;
(b) about Y equivalent percent of a short chain acyclic aliphatic dicarboxylic acid having from 2–10 aliphatic carbon atoms and
(c) about Y' equivalent percent of a short chain aliphatic monocarboxylic acid having from 3–5 aliphatic carbon atoms.

In such case, the ratio of Z to the sum of X, Y and Y' is less than 1. As is apparent in a situation where no monocarboxylic acid is employed, Y' would be zero.

The invention also provides binder compositions flexographic/gravure ink compositions containing such resins.

It has been found that the polyamide resins of this invention are more soluble in flexographic/gravure ink compositions containing more water and less volatile organic solvent than flexographic/gravure ink compositions containing polyamide resins based on polymeric fat acids. In spite of this increased water solubility, however, the polyamide resins yield ink coatings with acceptable water-resistance and other desirable properties.

DETAILED DESCRIPTION OF THE INVENTION

The polyamide resins of the present invention are prepared by reacting or polymerizing a mixture of an acid component which contains at least two different carboxylic acids with an amine component containing at least one diamine. These resins are acid terminated resins in that an equivalent excess of the dicarboxylic acids are used in relation to the diamine, so as to provide an acid value of greater than 30. Using such excess, the amine value will be low and the acid value will exceed the amine value by at least 20. Thus, the amine value will be 10 or lower. A monobasic acid can also be used in the acid component as a chain stopper. In achieving the acid value of at least 30, the ratio of amine equivalents of the diamines to the carboxyl equivalents of the acids is therefore less than 1, preferably less than about 0.9, more preferably ranges from 0.50 to about 0.85, and most preferably about 0.65 to 0.85.

The polyamides of the present invention may be defined as a polymer or resin obtained by the reaction of:
(A) an acid component comprising a mixture of
  (1) about X carboxyl equivalent percent of a medium chain aliphatic dicarboxylic acid having from 12–26 carbon atoms;
  (2) about Y carboxyl equivalent percent of a short chain alicyclic aliphatic dicarboxylic acid having from 2–8 carbon atoms; and
(B) an amine component comprising Z amine equivalent percent of an aliphatic diamine containing 2–12 carbon atoms.
wherein the equivalent ratio of Z to the sum of X and Y is less than 1 so as to provide an acid value greater than 30. With such acid values, the acid value will exceed the amine value by about 20.

When a monocarboxylic acid is employed, the acid component will comprise a mixture of:
(1) X carboxyl equivalent percent of the medium aliphatic dicarboxylic acid defined above;
(2) Y carboxyl equivalent percent of the short chain dicarboxylic acid defined above; and
(3) Y' carboxyl equivalent percent of a short chain aliphatic monocarboxylic acid having from 2–6 carbon atoms.

With an acid component as above, the ratio of Z to the sum of X, Y and Y' is less than 1 so as to provide an acid value greater than 30.

The carboxylic acid useful in the present invention accordingly can be divided into two groups on the basis of chain length. The acids of one group have medium-chain length and the acids of the other group have short-chain length. The medium-chain aliphatic dicarboxylic acids are present in all of the polyamide resins of this invention. The other group of acids, i.e. the short-chain carboxylic acid used to prepare the polyamide resins of this invention, can be further subdivided into two groups on the basis of functionality. In general, it is preferred that the short-chain acyclic dicarboxylic acids be used to the exclusion of the short-chain aliphatic monocarboxylic acids (in which case the amount Y' is zero), especially when the diamine chosen is isophorone diamine, and that the short-chain aliphatic monocarboxylic acids be used to the exclusion of the short-chain acyclic aliphatic dicarboxylic acids (in which case the amount Y is zero), especially when the diamine chosen is ethylene diamine.

The medium-chain aliphatic dicarboxylic acids (hereinafter referred to as the medium-chain diacids) necessary in this invention have from 12 to 26 carbon atoms, preferably from 16 to 22. This class of dicarboxylic acids includes not only the homologous series beginning with dodecanedioic acid and extending to the 24 carbon diacid, but also includes dicarboxylic acids that have branched alkyl chains and alicyclic structures in the molecule as well.

These medium chain dicarboxylic acids may be represented by the formula

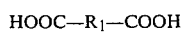

$$HOOC-R_1-COOH$$

where R is a divalent aliphatic hydrocarbon radical containing from 10 to 24 carbon atoms, straight or branched chain, acyclic or alicyclic. Preferably, R contains 14 to 20 carbon atoms.

A preferred class of medium-chain diacids are those having a carboxylic ring and three substituents wherein one substituent is a carboxyl group, a second substituent is an alkyl group having more than three aliphatic carbon atoms, and a third substituent is an alkyl group that is terminally substituted with a carboxyl group. Examples of the medium-chain diacid of this preferred class may be obtained as the Diels Alder reaction products of acrylic acid with a fatty acid having two conjugated ethylenic unsaturations. A preferred example of the medium-chain diacids is 2-n-hexyl-5-(7-carboxylic-n-heptyl)-cyclohex-3-ene carboxylic acid which is a $C_{21}$ acid available from Westvaco, Charleston Heights, S.C., as Westvaco DiAcid.

The short-chain acyclic aliphatic dicarboxylic acids (hereinafter referred to as short-chain diacids useful in this invention) have from 2 to 10 carbon atoms in a unbranched hydrocarbon chain. The short-chain diacids can be characterized as a homologous series of dicarboxylic acids which begins with oxalic acid, ends with decanedioic acid, and includes each member in-between. The short chain diacids may also be represented by the formula

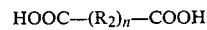

$$HOOC-(R_2)_n-COOH$$

where $R_2$ is defined as a divalent, straight chain alkylene radical having 2–8 carbon atoms and n is 0 or 1. When n is 0, the acid is oxalic acid, HOOCCOOH. When n is 1, the acids include the dicarboxylic acids from propanedioic (malonic) to decanedioic (sebacic). The preferred short-chain diacids are azelaic acid and adipic acid.

The amounts of short-chain diacid and medium-chain diacid used in the polyamides of this invention are preferably chosen such that the ratio of equivalents of the short-chain diacid to equivalents of the medium-chain diacid range from about 4:1 to about 0.66:1, more preferably from about 3:1 to about 0.8:1, and most preferably from about 1:1 to 2:1.

The short-chain aliphatic monocarboxylic acids (hereinafter referred to as short-chain monoacid) useful in this invention have from 2 to 6 carbon atoms. These monocarboxylic acids may be represented by the formula $$R_3—COOH$$

where $R_3$ is a straight or branched chain alkyl group containing from 1-5 carbon atoms. The short chain acids are exemplified by acetic, propionic acid, n-butanoic acid, isobutanoic acid, and the like. The preferred short-chain acid is propionic acid.

The amounts of the medium-chain diacid and short-chain monoacid used in the polyamides of this invention are preferably chosen such that the ratio of equivalents of the medium-chain diacid to the equivalents of the short-chain monoacid ratio of about 1:1 to about 5:1, more preferably from about 2:1 to about 4:1, and most preferably about 3:1.

The acid component of the present invention will accordingly be composed as follows:

| Acid Component - 100 Equivalents | Eq. % |
|---|---|
| Medium Chain Dicarboxylic Acid | 20-100 |
| Short Chain Dicarboxylic Acid | 0-80 |
| Short Chain Monobasic Acid | 0-35 |
| Carboxyl Equivalent Percent | 100 |

The polyamides of this invention are prepared from mixtures that are substantially free of polymeric fat acids. These polymeric fat acids, which can be characterized as long-chain polybasic acids, are described in U.S. Pat. No. 3,776,865. These polymeric fat acids are derived by polymerizing either saturated or unsaturated fatty acids. It has been found that the amount of polymeric fat acid used in the polyamides of this invention should be minimized to obtain improved water solubility in the polyamide resin. The mixtures from which the resins of this invention are prepared are substantially free of polymeric fat acids, i.e. they may contain an amount of a polymeric fat acid equal to as much as 5 equivalent percent of the polyamide reaction mixture but preferably less than 5 equivalent percent and most preferably zero equivalent percent. With amounts of about 10 equivalent percent, i.e. 12.5 equivalent percent of a polymeric fat acid, the properties are adversely affected to the point where the products are insoluble or gelled and unsuitable for use in flexographic inks.

The diamine used to form the polyamide resins of this invention is comprised of at least one aliphatic diamine having from 2 to 12 aliphatic carbon atoms. The preferred diamines can be divided into two preferred groups. One group consists of cyclic aliphatic diamines having from 8-12 aliphatic carbon atoms, e.g. isophorone diamine. The other preferred group is comprised of short-chain alkylene diamines which can be represented by the formula:

$$H_2N—R—NH_2$$

wherein R is an alkylene radical having from 2 to 8 carbon atoms. R may be branched or straight chained, the straight chain radicals being preferred. Specific examples of short-chain alkylene diamines are ethylene diamine, diamino-propane, diamino-butane, and hexamethylene diamine.

The polyamide resins of this invention will contain the structural unit $$\overset{H}{\underset{}{-N}}-R-\overset{H}{\underset{}{N}}- \text{ and } -\overset{O}{\underset{}{C}}-R_1-\overset{O}{\underset{}{C}}-$$

where R and $R_2$ are as earlier defined. Where a short chain dicarboxylic acid is also employed, the resin will also contain the structural unit $$-\overset{O}{\underset{}{C}}-R_2-\overset{O}{\underset{}{C}}-$$

The short chain monocarboxylic acid is employed as a chain stopper which, along wih the acid and amine ratios employed, will control the degree of polymerization of the mixture, the number of recurring structural units, and the amine and acid numbers.

The resins are prepared from mixtures contaning a dicarboxylic acid component and a diamine component by known methods for the polymerization of diacids and diamine to form polyamides. In general, a mixture of the diacid component and the diamine component is heated to a temperature between about 100° C. and 250° C. in a vessel equipped for the removal of the by-product water formed in the polyamidification reaction; e.g. a vessel fitted with a distillation column and condenser so as to remove water from the reaction zone.

Typically the reaction mixture will be heated at lower temperatures initially to avoid any volatilization and loss of any short chain monoacid which may be employed, after which the temperature is raised to the higher reaction temperature. Thus, it is common to heat at about 140° C. for about 1 hour followed by raising the temperature to about 250° C. and reacting for about 1.5-3 hours.

Similarly, a portion of the charge of the medium-chain diacid can be reserved from the initial charge of reactants. The initial reactant mixture can be initially reacted to ensure that substantially all of the short-chain monoacid is incorporated into the resin. The reserved portion of medium-chain diacid is then charged and the resulting mixture is allowed to react to obtain an acid terminated product. For example, from about 25% to about 50% of the medium-chain diacid to be charged is reserved from the initial charge which is heated at about 140° C. for one hour. The reserved portion of medium-chain diacid is then added to the reaction mixture and the temperature is raised to about 250° C. for about 1½ to 3 hours to obtain a product having acid termination.

The degree of polymerization of the mixture should be controlled, along with the choice of ratio of diamine to diacids, to obtain a polyamide having a high acid value (greater than 30). The acid value of the polyamide preferably should be greater than about 50, Generally, the products will have an acid value between 30 up to about 100. With such acid values, the amine numbers will be low, less than about 10, approaching a value of about 1-5. Thus, the acid number will exceed the amine value by about 20, and generally higher.

The polyamide resins of this invention form the binder compositions of this invention when dissolved in an aqueous solvent containing an organic amine. The resin is added to the solvent in an amount of about 30% to about 40% resin solids based on the weight of the solvent. Examples of suitable organic amines include primary, secondary and tertiary amines which can act as a base to salt the acid terminated polyamides. Particularly preferred organic amines are the dialkylaminoalkanols, such as 2-(N,N-dimethylamino)ethanol and 2-(N,N-diethylamino)ethanol.

The organic amine is present in the aqueous solution in an amount sufficient to solubilize the chosen polyamide resin. In general, the organic amine will be present in the aqueous solution in an amount sufficient to theoretically neutralize the acid groups of the polyamide, i.e. the amount of organic amine is stoichiometrically equivalent to or greater than the acid value of the polyamide. For example, a 7.4% solution of dimethylaminoethanol is stoichiometrically equivalent to a polyamide resin having an acid value of about 70 used at the level of 40% resin solids. A large excess of organic amine should be avoided because retention of the organic amine in the cured binder may adversely affect the water retention of the binder.

These binders are particularly useful in flexographic/gravure ink compositions.

The flexographic/gravure ink compositions of this invention are preferably made by dispersing a flexographic/gravure ink pigment in the binder compositions of this invention.

It is an advantage of the present invention that less volatile organic solvent is needed to solubilize the resin in the binder compositions used to make flexographic/gravure ink compositions of this invention than is needed to solubilize the dimer acid resins of U.S. Pat. No. 3,776,865. Generally, the flexographic/gravure ink compositions of this invention can contain less than about 25% by volume volatile organic solvent. The preferred resins can be used to prepare binders which contain even less volatile organic solvent, e.g. 5% to 20%, but which still yield flexographic/gravure ink coatings having good water resistance.

EXAMPLES

The following Examples show the preparation and properties of polyamide resins representative of the polyamide resins of this invention and the preparation and properties of comparative polyamide resins. The polyamide resins of this invention are denoted by an arabic numeral and the comparative polyamide resins are denoted by a letter.

Definitions

In the following Examples, the following terms, abbreviations and symbols have the following meanings:

MCD: 2-n-hexyl-5-(7-carboxyl-n-heptyl)-cyclohex-3-ene carboxylic acid, available from Westvaco as Westvaco DiAcid.
ADA: adipic acid
AZA: azelaic acid
PRA: propionic acid
IPD: isophorone diamine
EDA: ethylene diamine

RESIN PREPARATION

The resins described in the Examples below were prepared by charging the acid and amine reactants shown in the Tables to a reactor along with about 1% of an 85% solution of phosphoric acid as a catalyst. In Example 5, a portion of the MCD was indicated was reserved from the initial charge and added after most of the PRA had reacted. The reaction mixture was heated to 250° C. and held for 2 hours at that temperature. The resulting resins had the softening point as determined by the Ball and Ring method and the acid value, reported in milligram KOH per gram of sample, in Table I below.

The resins of Comparative Examples A, B and C were prepared using a polymeric fat acid available from Henkel Corporation as VERSADYME ® 204 which has the following analysis:

| | |
|---|---|
| Saponification Value (S.V.) | 198.5 |
| Acid Value (A.V.) | 189.2 |
| Thermosel Viscosity (25°.) | 54.4 poises |
| Color (Gardner - no solvent) | 7+ |
| Fe | 3.7 ppm |
| P | 25 ppm |
| S | 44 ppm |
| Iodine Value | 99.9 |
| % Monomer (M) | 10.9 |
| % Intermediate (I) | 5.3 |
| % Dimer (D) | 71.1 |
| % Trimer (T) | 12.6 |

TABLE I

POLYAMIDE RESIN PREPARATION AND RESIN PROPERTIES

| Example | PFA (eq.) | MCD (eq.) | ADA (eq.) | AZA (eq.) | PRA (eq.) | IPD (eq.) | EDA (eq.) | Softening Point (°C.) | Acid Value (mg KOH/g sample) |
|---|---|---|---|---|---|---|---|---|---|
| 1 | — | 1 | — | 3 | — | 2.72 | — | 97 | 98.6 |
| 2 | — | 1 | 1 | — | — | 1.4 | — | 126 | 93.0 |
| 3 | — | 1 | 1 | — | — | 1.7 | — | 148.5 | 35.1 |
| 4 | — | 1 | 1 | — | — | 1.3 | — | 117.0 | 85.4 |
| 5 | — | 3 | — | — | 1 | — | 3.28 | 87 | 49.6 |
| A | 1.25 | — | — | — | — | 1 | — | 95 | 28.5 |
| B | 1 | — | 1 | — | — | 1.7 | — | 124 | 30.0 |
| C | 1 | — | 1 | — | — | 1.2 | — | 67.5 | 90.3 |

The solubility of the resins described in Table I in the following two solvents was determined.

Solvent #1 was a mixture of 92.6% deionized and 7.4% dimethylaminoethanol. Solvent #2 was a mixture of 77.1% deionized water, 21.8% diethylaminoethanol, and 1.1% dimethylaminoethanol.

The solubility of the resins in the indicated solvents are indicated in the table by the use of the following symbols:

| | |
|---|---|
| + | soluble/fluid - very high in viscosity |
| − | insoluble fluid |
| −G | insoluble/gel |
| BG | borderline gel |

-continued

| +G | soluble/gel |

The remaining symbols in the table indicate the Gardner-Holdt viscosity of the solution obtained by mixing the resin and the indicated solvent.

TABLE II

SOLUBILITY AND VISCOSITY OF POLYAMIDE RESINS

| | SOLVENT #1 | | | SOLVENT #2 | | |
|---|---|---|---|---|---|---|
| | Resin solids (wt. %) | | | | | |
| EXAMPLE | 40 | 30 | 20 | 40 | 30 | 20 |
| 1 | +G | A1+ | A4+ | +G | X+ | A2− |
| 2 | +G | L+ | A4 | +G | + | A1 |
| 3 | BG | Y+ | A2 | +G | +G | A−A1 |
| 4 | −G | S | A3 | + | Z4+ | A−A1 |
| 5 | Z5-6 | +G | A | X-Y | +G | A− |
| A | −G | −G | — | +G | Z1 | A2 |
| B | BG | — | — | +G | Z1 | A2 |
| C | −G | G− | A2-3 | + | T-U | A2 |

The results shown in Table II show the representative resins of this invention have better solubility, particularly in a solvent having a very low concentration of organics, than the comparative polyamides prepared from polymeric fat acids.

Samples of the polyamide resins shown in Table I were mixed with n-propanol and titanium dioxide to prepare white inks containing 33.3% by weight titanium dioxide, 20% by weight resin, and 46.7% by weight n-propanol. These inks were rolled out at 1½ ml wet on glass to yield inks having the gloss shown in Table III. Samples of the inks were also rolled out on polyethylene and allowed to dry. The polyethylene samples were then immersed in water at 25° C. for 24 hours. The samples were then subjected to 50 manual rubs with cotton wadding. The samples were rated on a scale of 1-10 with 10 representing a finding that the test had no effect on the ink coating.

The gloss of the resulting inks and the results of the wet rub tests are shown in Table III below.

TABLE III

INK GLOSS AND WATER RESISTANCE

| | GLOSS | | |
|---|---|---|---|
| EXAMPLE | 60° | 20° C. | WET RUB |
| 1 | 85 | 16 | 10 |
| 2 | 78 | 39 | 10 |
| 3 | 76 | 45 | 10 |
| 4 | 64 | 17 | 10 |
| 5 | 67 | 20 | 10 |
| A | 89 | 76 | 10 |
| B | 82 | 51 | 10 |
| C | 86 | 61 | 10 |

The results shown in Table III indicate that the resins of this invention yield inks having good gloss and excellent resistance to water.

EXAMPLE 6

In this example, polyamides were prepared containing polymeric fat acids at a level of 12.5 equivalent percent, the lowest level shown in U.S. Pat. No. 3,776,865 to Glaser et al. A polyamide resin was also prepared from an acid component containing no polymeric fat acid, but having a low acid value of 16.5. These resins were evaluated and compared to the polyamide of Example 3 of the present invention, which has an acid value of 35.1. Five comparative resins were prepared using the Resin Preparation procedures disclosed earlier. In those resins employing a polymeric fact acid, a polymeric fat acid was employed having the same typical analysis given earlier. The amounts of the reactants, the acid value of the product and results of solubility of the products can be seen in the following Table IV.

TABLE IV

| | Reactants | | | | Acid Value (Ac-tual) | Solubility in Solvent | |
|---|---|---|---|---|---|---|---|
| Example | PFA | MCD | ADA | IPDA | | C-1 | C-2 |
| D | 12.5 | 37.5 | 50 | 84.4 | 37.2 | IS | Gel |
| E | 12.5 | — | 87.5 | 89.6 | 35.7 | Gel | Gel |
| F | — | 50 | 50 | 92.9 | 16.5 | IS-PS | IS-Gel |
| G | 12.5 | 37.5 | 50 | 93.2 | 14.4 | IS-PS | IS-Gel |
| H | 12.5 | — | 87.5 | 96.6 | 11.4 | IS-PS | IS-Gel |
| Example 3 | — | 50 | 50 | 85 | 35.1 | T-U* | Gel |

IS = Insoluble
PS = Phase Separation
* = Gardner Holdt Viscosity
C-1 and C-2 = Two Solvents described earlier and used in Table II - 30% Resin Concentration by weight As can be seen from the foregoing, the resin of the present invention has better solubility than the comparative resins D, E, G and H prepared with 12.5 equivalents of polymerized tall oil fatty acids and resin F (with no polymeric fat acid), resins D through F all having actual acid values below 30.

What is claimed is:

1. A polyamide resin obtained from the reaction of
   (A) an acid component substantially free of a polymeric fat acid comprised of a medium chain dicarboxylic acid of the formula HOOC—$R_1$—COOH where $R_1$ is a divalent aliphatic hydrocarbon radical containing from 10-24 carbon atoms and
   (B) an amine component comprised of a diamine of the formula $H_2N$—R—$NH_2$ where R is a divalent aliphatic hydrocarbon radical having from 2-12 carbon atoms
   wherein the ratio of amine equivalents of said amine component to the carboxyl equivalents in said acid component is less than one so as to provide a resin having an acid value greater than 30 and the acid value exceeds the amine value by at least 20.

2. A polyamide resin as defined in claim 1 wherein the ratio of amine equivalents to carboxyl equivalents is less than about 0.9.

3. A polyamide resin as defined in claim 1 wherein the ratio of amine equivalents to carboxyl equivalents is in the range of about 0.50 to about 0.85.

4. A polyamide resin as defined in claim 1 wherein said acid component comprises
   (A) about X carboxyl equivalent percent of said medium chain dicarboxylic acid and
   (A') about Y carboxyl equivalent percent of a short chain dicarboxylic acid of the formula HOOC—$(R_2)n$—COOH where $R_2$ l is a divalent, aliphatic hydrocarbon chain having from 2-8 carbion atoms, n is an integer of 0 or 1, and wherein the ratio of carboxyl equivalents of said short chain acid to carboxyl equivalents of said medium chain acid is in the range of about 4:1 to about 0.66:1.

5. A polyamide resin as defined in claim 4 wherein said ratio of short chain to medium chain acid is in the range of 3:1 to 0.8:1.

6. A polyamide resin as defined in claim 4 wherein said medium chain dicarboxylic acid is 2-n-hexyl-5-(7-carboxyl-n-heptyl)-cyclohex-3-ene carboxylic acid, said short chain dicarboxylic acid is one in which n is 1 and $R_2$ contains from 4–8 carbon atoms, and said diamine is selected from the group consisting of isophorone diamine and alkylene diamine wherein R has from 2–8 carbon atoms.

7. A polyamide resin as defined in claim 6 wherein said alkylene diamine is ethylene diamine.

8. A polyamide resin obtained from the reaction of
(A) an acid component comprising
(1) 20–100 carboxyl equivalent percent of a medium chain dicarboxylic acid of the formula

HOOC—$R_1$—COOH where $R_1$ is a divalent hydrocarbon radical containing from 10–24 carbon atoms;
(2) 0–80 carboxyl equivalent percent of a short chain dicarboxylic acid of the formula HOOC($R_2$)n—COOH where $R_2$ is a divalent, aliphatic hydrocarbon radical having from 2–8 carbon atoms and n is an integer of 0 or 1; and
(3) 0–35 carboxyl equivalent percent of a monocarboxylic acid having the formula $R_3$COOH where $R_3$ is an alkyl group having from 1–5 carbon atoms; with (B) an amine component comprising a diamine of the formula $H_2N$—R—$NH_2$ where R is a divalent, aliphatic hydrocarbon group having from 2–12 carbon atoms;
wherein the ratio of amine equivalents of said amine component to the carboxyl equivalents of said acid component is less than 1 so as to provide a resin having an acid value greater than 30 and wherein the acid value exceeds the amine value by at least 20.

9. A polyamide resin as defined in claim 8 wherein the ratio of amine equivalents to carboxyl equivalents is less than about 0.9.

10. A polyamide resin as defined in claim 8 wherein ratio of amine equivalents to carboxyl equivalents is about 0.50–0.85.

11. A polyamide resin as defined in claim 10 wherein said medium chain dicarboxylic acid is 2-n-hexyl-5-(7-carboxyl-n-heptyl)-cyclohex-3-ene carboxylic acid.

12. A polyamide resin as defined in claim 10 wherein said diamine is isophorone diamine.

13. A polyamide resin as defined in claim 10 wherein said diamine is ethylene diamine.

14. A polyamide resin obtained on condensation of isophorone diamine and a mixture of acids
(a) 2-n-hexyl-5-(7-carboxyl-n-heptyl)-cyclohex-3-ene carboxylic acid, and
(b) a short chain dicarboxylic acid selected from the group consisting of adipic and azelaic acid
wherein the ratio amine equivalents to carboxyl equivalents is in the range of about 0.50–0.85, so as to provide a resin having an acid value greater than 30.

15. A polyamide as defined in claim 14 wherein the equivalents ratio of said short chain dicarboxylic acid (b) to acid (a) is 1:1 to 3:1.

16. A polyamide resin obtained by the condensation of ethylene diamine and a mixture of acids
(a) 2-n-hexyl-5-(7-carboxyl-n-heptyl)-cyclohex-3-ene carboxylic acid, and
(b) propionic acid
wherein the ratio of amine equivalents to carboxyl equivalents is in the range of about 0.50–0.85 so as to provide a resin having an acid value greater than 30, and the equivalent rato of acid (a) to acid (b) is about 3:1.

17. A solution of the polyamide resin of claim 1 in an aqueous solvent containing an organic amine.

18. A solution as defined in claim 17 wherein said aqueous solvent contains said organic amine in an amount than about 5% of the aqueous solvent.

19. A flexographic/gravure ink composition comprised of the solution of claim 17 and a flexographic/gravure ink pigment.

20. A flexographic/gravure ink composition in accordance with claim 19 wherein the aqueous solvent contains an organic amine in an amount greater than about 5% by weight of the aqueous solvent.

* * * * *